United States Patent
Fischer et al.

(10) Patent No.: US 9,729,507 B2
(45) Date of Patent: *Aug. 8, 2017

(54) BI-DIRECTIONAL DATA SECURITY FOR SUPERVISOR CONTROL AND DATA ACQUISITION NETWORKS

(71) Applicant: Sierra Nevada Corporation, Sparks, NV (US)

(72) Inventors: Peter Fischer, Highlands Ranch, CO (US); Andrew Feldkamp, Littleton, CO (US); Nelson Rodriguez, Highlands Ranch, CO (US); Joshua Edwards, Castle Rock, CO (US)

(73) Assignee: Sierra Nevada Corporation, Sparks, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/668,602

(22) Filed: Mar. 25, 2015

(65) Prior Publication Data

US 2015/0215283 A1    Jul. 30, 2015

Related U.S. Application Data

(63) Continuation-in-part of application No. 14/168,283, filed on Jan. 30, 2014.

(51) Int. Cl.
*H04L 29/06* (2006.01)
*H04L 29/08* (2006.01)

(52) U.S. Cl.
CPC .......... *H04L 63/02* (2013.01); *H04L 63/0218* (2013.01); *H04L 63/0263* (2013.01);
(Continued)

(58) Field of Classification Search
CPC ............................ H04L 63/02; H04L 63/1408
See application file for complete search history.

(56) References Cited

U.S. PATENT DOCUMENTS 4,019,174 A    4/1977   Vanderpool et al.
5,157,769 A  * 10/1992   Eppley ................ G06F 13/4068
                                                            327/321
(Continued)

FOREIGN PATENT DOCUMENTS

EP          2175603         4/2010

OTHER PUBLICATIONS

International Search Report and Written Opinion on corresponding PCT application (PCT/US2015/011249) from International Searching Authority (KIPO) dated Apr. 22, 2015.
(Continued)

*Primary Examiner* — John B King
(74) *Attorney, Agent, or Firm* — Klein, O'Neill & Singh, LLP

(57) ABSTRACT

A cyber-security system, including a device and associated method, provides secure communications bi-directionally between an external network and an internal network, including a supervisor control and data acquisition (SCADA) device. The device includes a processor in data communication with the external and internal networks that is programmed with a rule-set establishing validation criteria configured to validate data received from the external and internal networks. The processor is operable in an operational mode to pass between the external and internal networks only data that are compliant with the validation criteria. The processor may be configured to save certain validated data indicating a system state that can inform the application of the rule-set to data. The processor is re-programmable with a new rule-set only in a programming mode. The device includes a switch that is manually operable to switch the processor from the operational mode to the programming mode.

36 Claims, 7 Drawing Sheets

(52) U.S. Cl.
CPC .......... *H04L 63/1408* (2013.01); *H04L 67/02* (2013.01); *H04L 69/22* (2013.01)

(56) References Cited

U.S. PATENT DOCUMENTS

| | | | |
|---|---|---|---|
| 5,327,546 | A | 7/1994 | Yokoi et al. |
| 6,502,003 | B1* | 12/2002 | Jacobs .................. G06F 1/1616 |
| | | | 700/90 |
| 7,356,736 | B2 | 4/2008 | Natvig |
| 7,649,452 | B2 | 1/2010 | Zilberstein et al. |
| 8,069,372 | B2 | 11/2011 | Natvig |
| 8,578,362 | B2* | 11/2013 | Brescia ..................... G06F 8/65 |
| | | | 713/2 |
| 2003/0005331 | A1 | 1/2003 | Williams |
| 2003/0093519 | A1 | 5/2003 | Jackson et al. |
| 2010/0036992 | A1 | 2/2010 | Sisto et al. |
| 2010/0095367 | A1 | 4/2010 | Narayanaswamy |
| 2010/0165878 | A1 | 7/2010 | Soni |
| 2010/0277270 | A1 | 11/2010 | Aikens et al. |
| 2010/0287603 | A1* | 11/2010 | Alexander .......... G06F 21/6218 |
| | | | 726/6 |
| 2011/0039237 | A1* | 2/2011 | Skare ................. G05B 23/0267 |
| | | | 434/118 |
| 2011/0249816 | A1 | 10/2011 | Choi et al. |
| 2012/0144187 | A1 | 6/2012 | Wei et al. |
| 2012/0151558 | A1 | 6/2012 | Byres et al. |
| 2012/0198541 | A1 | 8/2012 | Reeves |
| 2015/0135254 | A1* | 5/2015 | Thilenius ............ H04L 63/0227 |
| | | | 726/1 |

OTHER PUBLICATIONS

International Search Report on corresponding PCT application (PCT/US2016/023225) from International Searching Authority (USPTO) dated Jun. 6, 2016.
Written Opinion on corresponding PCT application (PCT/US2016/023225) from International Searching Authority (USPTO) dated Jun. 6, 2016.
Non-Final Office Action on co-pending (U.S. Appl. No. 14/168,283) dated Mar. 10, 2016.
Notice of Allowance on co-pending (U.S. Appl. No. 14/168,283) dated Oct. 7, 2016.
Extended Search Report from European Patent Office on co-pending EP application (EP15742692.5) dated May 22, 2017.

* cited by examiner

BI-DIRECTIONAL DATA SECURITY FOR SUPERVISOR CONTROL AND DATA ACQUISITION NETWORKS

CROSS-REFERENCE TO RELATED APPLICATIONS

The present application is a continuation-in-part of co-pending U.S. patent application Ser. No. 14/168,283, filed Jan. 30, 2014 titled BI-DIRECTIONAL DATA SECURITY FOR SUPERVISOR CONTROL AND DATA ACQUISITION NETWORKS, the disclosure of which is hereby incorporated by reference as if set forth in full herein.

FEDERALLY SPONSORED RESEARCH OR DEVELOPMENT

Not Applicable.

BACKGROUND

This disclosure relates generally to the field of cybersecurity for automation and control systems that are monitored and/or controlled over public or private internet protocol (IP) networks. More specifically, it relates to devices and methods for providing secure communications to and from one or more supervisor control and data acquisition (SCADA) devices in such automation and control systems.

Supervisor Control and Data Acquisition (SCADA) devices, such as switches, meters, and sensors, enable real-time monitoring and control of automation and control systems over public or private internet protocol (IP) networks. Most SCADA devices utilize industrial communication protocols, such as Modbus or Distributed Network Protocol V3.0 (DNP3), which are not designed with robust built-in security. Thus, these networked devices may be susceptible to cyber-terrorism and other malicious attacks that can shut down operations and cause damage to physical equipment. Potential attacks include social engineering, malware, buffer overflow, input validation and man-in-the-middle attacks, from internal or external networks, whether connected to private local networks or the public Internet. This poses a serious cyber-security challenge and risk to critical infrastructure in many industries, such as, for example, petroleum refining, natural gas processing, chemical processing, power generation and distribution, water purification, and even financial institutions.

FIG. 1 illustrates a conventional SCADA network 10 of automation and control devices. The network 10 includes a plurality of SCADA devices 12 linked to an external or remote SCADA control terminal 14 by a network communication device 16, such as, for example, a router. Communication between the remote terminal 14 and the communication device 16 may be through the Internet (as shown), or alternatively, through a Local Area Network (LAN) or a Wide Area Network (WAN). A local or internal SCADA control terminal 18 may also be linked to the SCADA devices 12 and the external control terminal 14 by the communication device 16.

Commercially available options exist for providing a degree of security for networks such as the network 10 shown in FIG. 1. Some options, that operate at the transport layer or higher, such as firewalls, security proxies, intrusion detection systems, and application layer solutions, do not provide physical network segregation. Physical and data-link layer specific solutions, such as network segregation, do not protect against attacks that originate from the internal\segregated network, and they present additional integration issues for SCADA control networks. None of these solutions are able to provide real-time protection for SCADA devices that can be customized for the industrial process and system for which they are installed.

Accordingly, a solution has been sought to the problem of ensuring cyber-security for SCADA networks by protecting them from both internal and external attacks and threats. Moreover, it would be advantageous to provide such protection bi-directionally; that is, by protecting both incoming data (data coming into the SCADA devices from the network with which the device is linked) and outgoing data (data communicated from the SCADA devices to the network).

SUMMARY

Broadly, in accordance with at least some embodiments of this disclosure, a bi-directional cyber-security ("data guard") device for a SCADA network is installed in-line between each SCADA device and a network (either internal or external) to protect each SCADA device from attack, and to validate the integrity of all data and commands sent to each SCADA device and all information sent from each SCADA device to the network for further dissemination. The bi-directional SCADA network cyber-security or "data guard" device provides protection across all seven OSI model layers by installing a physical hardware isolation barrier between each SCADA device and the network, with a customizable rule-set programmed into the device for processing inbound and outbound data (commands and messages). A cyber-security or "data guard" device according to these embodiments is configured to pass only validated data, and to delete and/or block data that do not conform to validation criteria established by the rule-set. The rule-set can be customized for each SCADA device and the control network. Advantageously, in an aspect, separate rule-sets are provided to define how inbound and outbound data are processed, and either deleted/blocked or validated.

More specifically, a cyber-security device in accordance with embodiments of this disclosure comprises a processor programmed with a data validation rule-set (preferably, but not necessarily, separate data validation rule-sets for inbound and outbound data); an external communication interface configured for bi-directional data communication between the processor and an external network; and an internal communication interface configured for bi-directional data communication between the processor and at least one SCADA device, wherein the data received by the processor via either the external or internal communication interface is either deleted/blocked or passed by the appropriate rule-set, depending on whether the data conform to validation criteria established by the rule-set. The processor analyzes the data, preferably byte-by-byte, with the data in each byte being required to conform to the rule-set validation criteria before being passed from the processor to the appropriate interface. The processor may also be configured to be re-programmed with new rule-sets during start-up ("re-booting"), but only when a programming switch, preferably a physical hardware switch, is actuated during start-up, thereby assuring that the security provided by the rule-set validation criteria cannot be defeated or compromised without physical access to the cyber-security device.

In accordance with another aspect of the disclosure, a method of validating data transmitted between an internal network including a SCADA device and an external network comprises, in at least some embodiments, (a) providing a processor programmed with a rule-set establishing data validation criteria; (b) communicating data to the processor from one of the internal and external networks; (c) operating the processor to determine if the data conform to the data validation criteria established by the rule-set; and (d) communicating the data from the processor to the other of the internal and external networks only if the data conform to the validation criteria.

DETAILED DESCRIPTION

Figure 1:
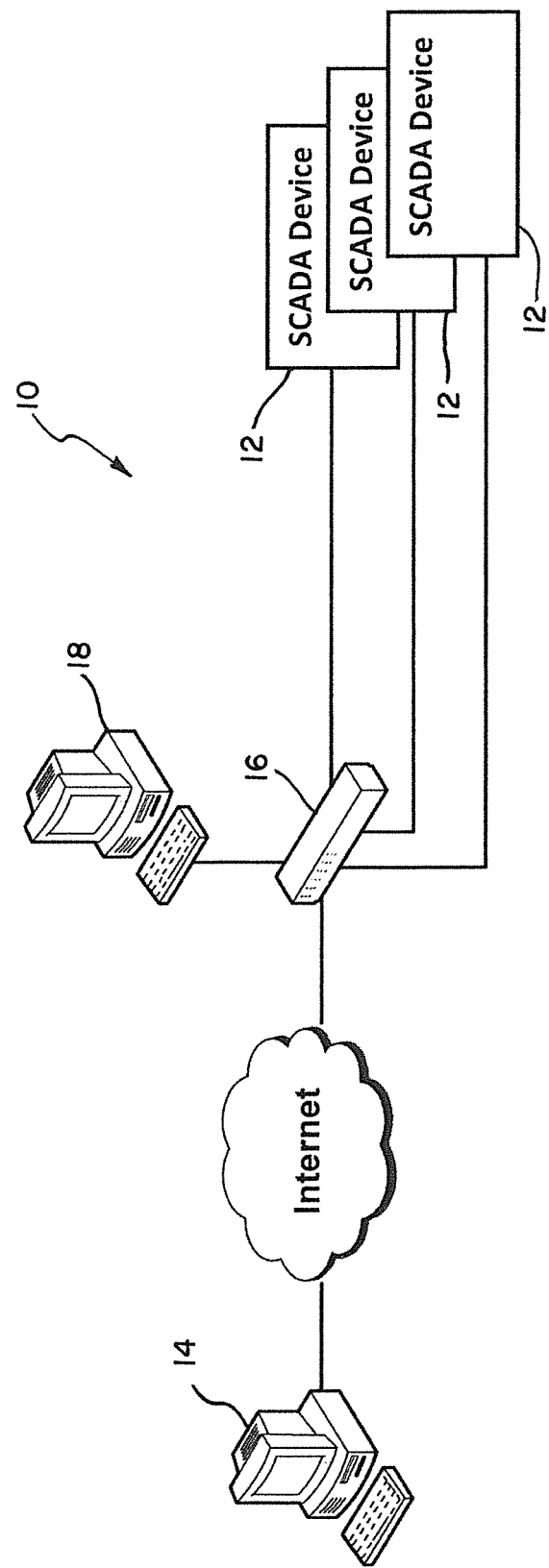
FIG. 1 is a simplified semi-schematic representation of a conventional unsecured SCADA network, as described above under "BACKGROUND;"

The following detailed description describes the present aspects with reference to the drawings. In the drawings, reference numbers label elements of the present aspects. These reference numbers are reproduced below in connection with the discussion of the corresponding drawing features.

It will be understood that any of the aspects described with reference to the figures may be implemented using software, firmware, hardware (e.g., fixed logic circuitry), or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware-based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or it can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The aspects disclosed herein may be implemented as a computer process (method), a computing system, or as an article of manufacture, such as a computer program product or computer-readable media. The computer program product may be embodied or implemented as non-transitory, computer storage media, readable by a computer device, and encoding a computer program of instructions for executing a computer process. The computer program product may also be readable by a computing system, and encoding a computer program of instructions for executing a computer process.

Figure 2:
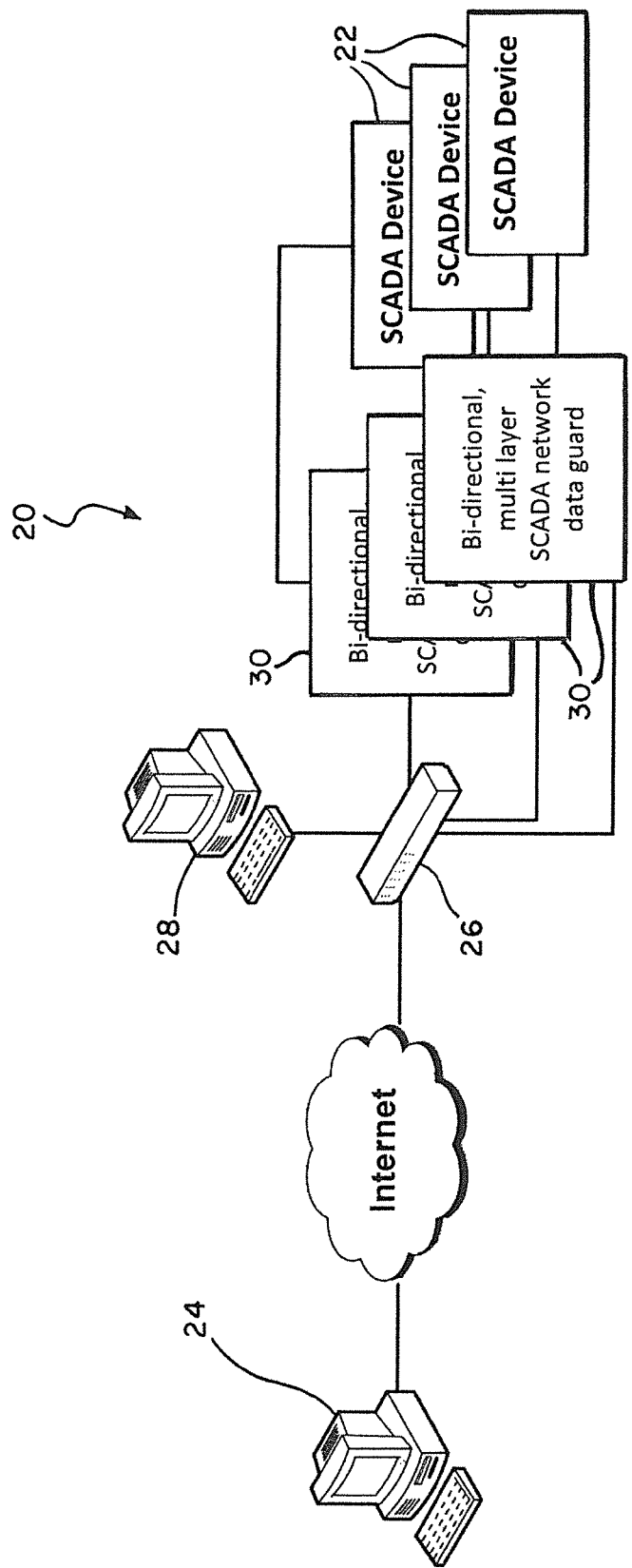
FIG. 2 is a simplified semi-schematic representation of a SCADA network including cyber-security devices according to the present disclosure.

FIG. 2 shows a SCADA network 20 that includes a plurality of SCADA devices 22 linked to an external or remote SCADA control terminal 24 by a network communication device 26, such as, for example, a router. Communication between the remote terminal 24 and the communication device 26 may be through the Internet (as shown), or alternatively, through a Local Area Network (LAN) or a Wide Area Network (WAN). A local or internal SCADA control terminal 28 may also be linked to the SCADA devices 22 and the external control terminal 24 by the communication device 26.

The network 20 differs from the network 10 of FIG. 1, as described above, primarily by the provision of one or more cyber-security devices or "data guards" 30, in accordance with this disclosure. The data guards 30, which will be described in detail below, are installed between the SCADA devices 22 and the communication device 26, whereby all data communicated to or from each SCADA device passes through, and is processed by, one data guard 30, as will be described below. Preferably, a single data guard device 30 is operationally associated with each SCADA device 22, so that each SCADA device 22 has its own dedicated data guard device 30, but other configurations may be suitable, depending on the particular application. Thus, a network may be configured, for example, with one data guard device 30 operationally associated with two or more SCADA devices 22. In an aspect, the data guard device(s) 30 is (are) transparent to the network and would not require changes to or be detected in the network's normal operation.

In an aspect, a data guard 30 includes a programmable rule-set that provides one or more rules for handling network messages that are sent through it. In an aspect, a rule-set comprises a configuration file loaded into a specific location in memory or device storage. Accordingly, the rule-set can be customized for each SCADA device and the control network with which the data guard is associated. A rule-set may include static rules, such as "allow" or "deny" based on the message protocol and content. A rule-set may also include dynamic rules that use variables that can be assigned to message data fields or registers. In this manner, large numbers of "static rules" may be condensed into smaller rule-sets. For example, a dynamic rule may allow messages over a range of message data addresses or command sequences only during certain times of day and another range of message data addresses or command sequences during a different time of day. The data guard 30 is configured, in an aspect, to allow only limited changes to its configuration, such as the rule-set and network settings. In an aspect, all other data locations may be restricted from change to provide more security to the operation of the data guard 30.

Figure 3:
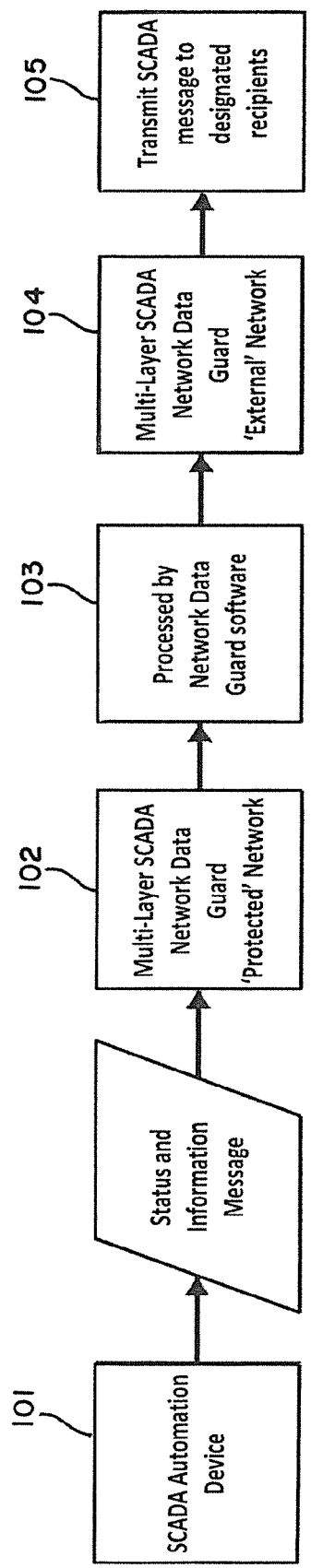
FIG. 3 is a generalized, high-level flow chart representing the flow of data outward from the SCADA devices to the remote terminal in the network of FIG. 2.
Figure 4:
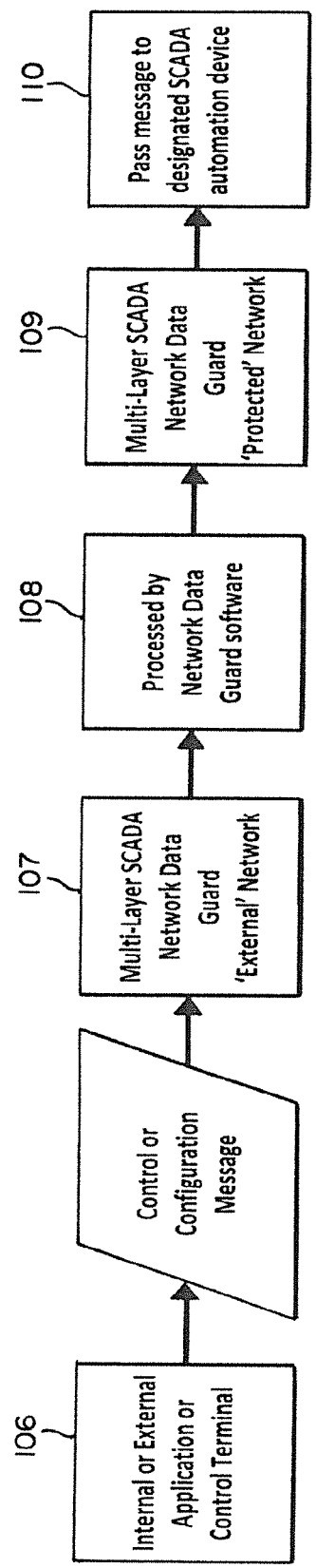
FIG. 4 is a generalized, high-level flow chart representing the flow of data from the remote terminal to one or more of the SCADA devices in the network of FIG. 2.

FIGS. 3 and 4 show generally the flow of data into and out of a data guard device 30. In FIG. 3, outbound data (information and/or messages) are generated (step 101) by one of the SCADA devices 22. The data may represent status information and/or messages acquired by the SCADA device 22 from the automation and control system (not shown) in which the SCADA device 22 is installed. The SCADA-generated data are received by the data guard device 30 (step 102) through a protected internal communication interface, preferably an Ethernet interface. The data are then processed (step 103) by validation software in the data guard device 30, first to screen out any data deemed invalid or malformed ("unqualified" data) based on a rule-set in accordance with a predefined SCADA protocol that is established by the security software installed in the data guard device 30. Any unqualified data are blocked or deleted (dropped), and a corresponding event log entry may advantageously be created. Well-formed ("qualified") data are then validated against the rule-set established by the security software to assure compliance with the data validation criteria established by the rule-set. Any data that are not in compliance with the validation criteria are deleted or blocked, and an event log entry may advantageously be created. Only data that are validated by compliance with the validation criteria are passed (step 104) to a protected external communication interface (e.g., an Ethernet interface) and then to a control network (e.g., a LAN or WAN), and finally to one or more designated recipients (step 105), which may include the remote SCADA control terminal 24 and, if present, the local SCADA control terminal 28.

The processing of step 103 may also serve another purpose with respect to SCADA sent messages. In some aspects, the messages may be scanned to understand the state of the SCADA device that sent the message. In general, in some aspects, a SCADA device may operate as a state machine, meaning that it must be in one of a finite number of conditions or states at any given time. In such a system, the SCADA device operates under a particular set of rules allowed in that current state until conditions cause the device to transition to a new state. In that new state, a different set of rules may apply. As such, in an aspect, the data guard device may use data from within SCADA device messages to understand the current state and to process network messages, such as commands, accordingly.

For example, certain messages may communicate the values of variables associated with the SCADA device. When these variables are deemed important, the data guard device 30 may maintain and update a copy of that variable for use in processing other messages. These state variables may be stored in registers, volatile and/or non-volatile memory, or the like. In one aspect, it is preferred that any state variable data be updated only after the message is qualified and validated. In other aspects, however, state variable data may be processed simultaneously with other processing or in another order. In an aspect, therefore, the state-based rule-sets operate at the OSI layer 7 (application layer) by looking at the value of variables indicating the device or system state.

Figure 7:
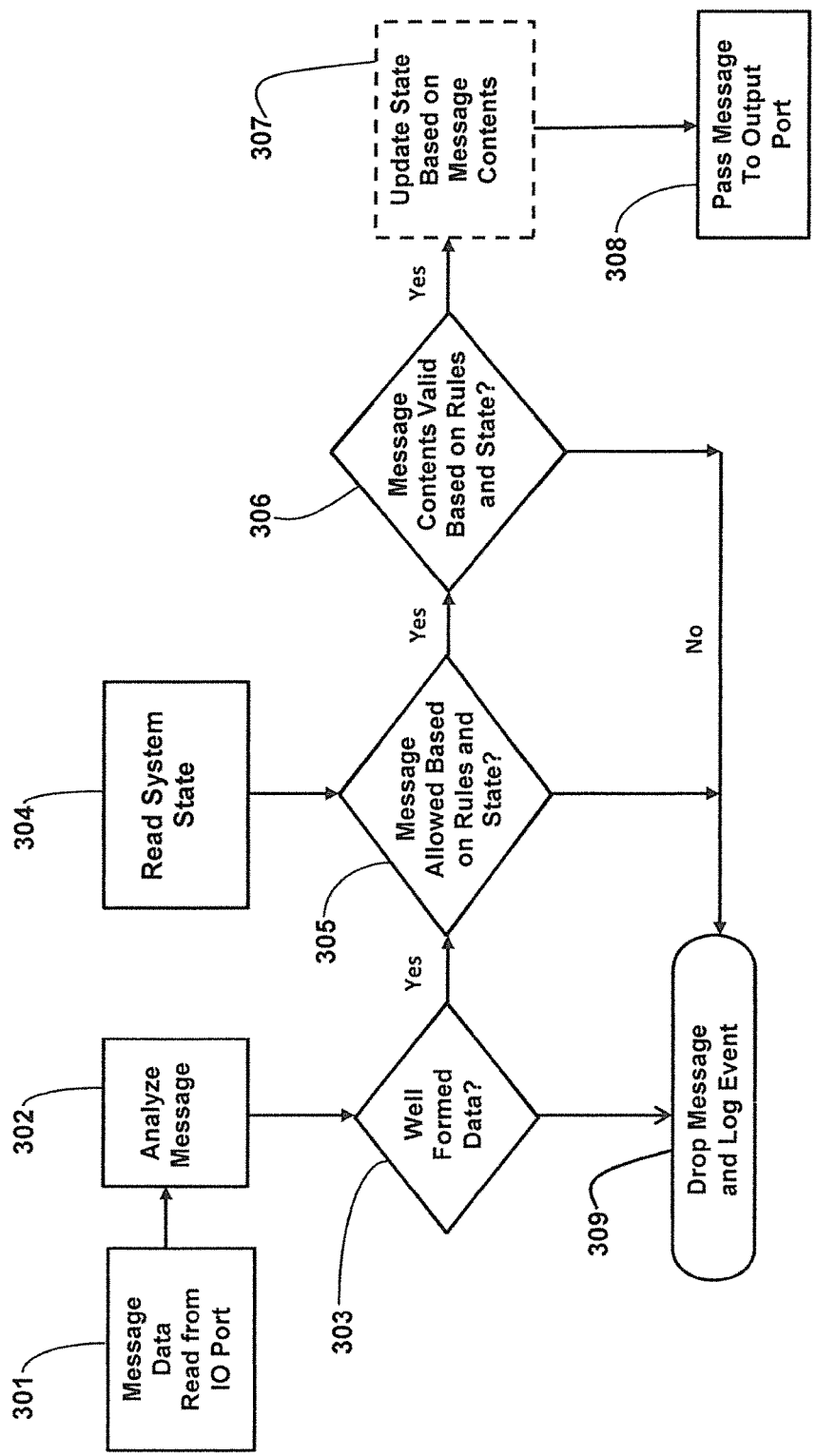
FIG. 7 is a flow chart representing the steps of validating data in accordance with another embodiment of the present disclosure that takes into account the industrial process or system in which the device is installed.

As will be described in more detail below with reference to FIG. 7, the data guard device 30 may seek to store this state data in order to factor in the state of a device when processing and validating messages, as some messages may be allowed or denied only in specific situations. Updating the state variables based on processing conforming messages allows the data guard to remain transparent in the sending and receiving of messages. Typically in such systems, the SCADA device 22 is being polled by one or both of the remote SCADA control terminal 24 and the local SCADA control terminal 28 at regular intervals during normal operation, whereby the data guard 30 is likely to have relatively accurate state information simply from reading the contents of the responses of the SCADA device 22. In another aspect, a data guard 30 may poll a SCADA device 22 or other connected device for its state by generating its own data request messages. In some cases, this is a less desirable—but still functional—method of operation.

In FIG. 4, inbound data, from, for example, the remote SCADA control terminal 24 and/or the local SCADA control terminal 28 (step 106) are received by the protected external communication interface (step 107) and then processed (step 108) as described above with reference to FIG. 3. Only data that are validated by compliance with the validation criteria are passed (step 109) to the protected internal communication interface (described below) and then to the designated SCADA device 22 via an appropriately configured network connection (step 110).

While the state of one or more SCADA devices 22 is more likely to be of importance in processing messages through a data guard device 30 than the state of a device on the communication device 26 side (or "public" side) of the data guard 30, state variable data information may also be processed from messages directed to a SCADA device 22 in a manner as described above with respect to FIG. 3.

Figure 5:
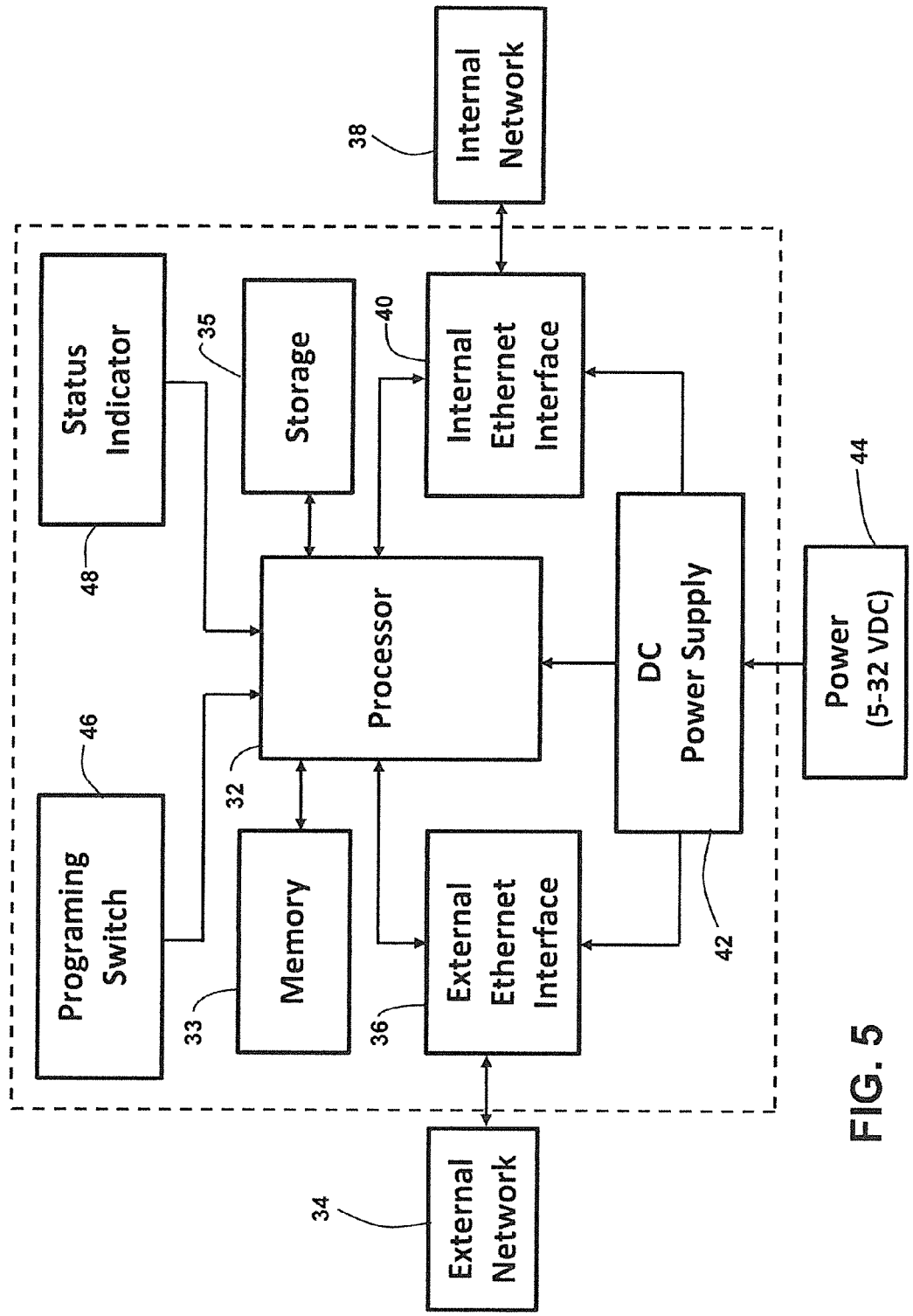
FIG. 5 is a diagrammatic representation of an embodiment of a cyber-security device in accordance with the present disclosure.

FIG. 5 schematically illustrates an instantiation of the cyber-security or "data guard" device 30 as installed in an automation and control network. In an aspect, as illustrated, the device 30 includes at least one processor 32 that communicates with an external network 34 by means of an external communication interface, e.g., an external Ethernet interface 36, and with an internal network 38 by means of an internal communication interface, e.g., an internal Ethernet interface 40. In an aspect, the processor 32 may be understood as including memory 33 and non-volatile storage 35 with which a processor module communicates. For example, either or both of the memory 33 and the non-volatile storage 35 may optionally be included with the processor 32 in a microcomputer, as is well known, or they may be separate components. In an aspect, power is provided by a DC power supply 42 that is connectable to any suitable external power source 44 that delivers electrical power at, for example, 5 to 32 VDC, and that converts the voltage from the source 44 to a voltage suitable for operating the electronic components of the device 30. Ethernet is a common network protocol used for network communication. The original Ethernet bus or star topology was developed for LANs to transfer data at 10 Mbps (megabits per second). Newer Ethernet standards (for example, Fast Ethernet (100 Base-T) and Gigabit Ethernet) support data transfer rates that are greater than 1 gigabit (Gb). The various aspects described herein may use Ethernet (which includes 100 Base-T and/or Gigabit Ethernet) as the network protocol. However, the adaptive aspects disclosed herein are not limited to any particular protocol, as long as the functional goals are met by an existing or new network protocol. For example, Fibre Channel (FC) or Fibre Channel over Ethernet (FCoE) or DNP3, as mentioned above, are other communications protocols that may also be used, among others, in various aspects.

The one or more processors 32, also known as central processing units (CPUs), may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. In an aspect, the processor 32, non-volatile storage 35 and/or memory 33 may be combined in a system-on-a-chip (SoC) configuration, such as those commercially available based on ARM or x86 designs. In other aspects, memory 33 and/or storage 35 may be separate components.

Each of the processors 32 executes machine-implemented instructions (or process steps/blocks) out of memory 33. In an aspect, processor 32 communicates with the other components through one or more interconnects (unlabeled) that may be referred to as a computer bus or set of computer buses, as is well-known. A computer bus may be, for example, a system bus, a Peripheral Component Interconnect (PCI) bus, a PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus. It is preferable that each processor 32 sits between separate buses to connect to the external Ethernet interface 36 and the internal Ethernet interface 40, such that the processor cannot be bypassed by any direct path between the external network 34 and internal network 38.

The storage device 35, which may be or include, for example, a hard disk (HDD), a CD-ROM, a non-volatile memory device such as flash, a hybrid drive (sometimes referred to as SSHD), or any other storage device for storing persistent, structured or unstructured data. Storage 35 may store operating system program files (or data containers), application program files, and one or more rule-sets in the form of scripts, functions, programs, configuration files or other file types. In an aspect, storage 35 may also include a data file or data structure that maintains indications of device states as described herein.

Memory 33 also interfaces with the processor(s) 32 with access to memory storage. Memory 33 may include any suitable type of random access main memory (RAM) for example. When executing stored computer-executable process steps from storage 35, the processor(s) 32 may store and execute the process steps out of memory 33. Read only memory (ROM, not shown) may also be used to store invariant instruction sequences, such as startup instruction sequences or basic input/output system (BIOS) sequences for operation of a keyboard (not shown). In an aspect, memory 33 may include a data structure storing device state indications as described herein for use when processing messages with a state-varied rule-set, as described below with reference to FIG. 7.

As discussed above, each processor 32 is programmable with a rule-set that validates both inbound data that is received from the external Ethernet interface 36, and outbound data that is received from the internal Ethernet interface 40. In an aspect, as mentioned above, inbound and outbound data are processed by their respective rule-sets that may be simultaneously or separately programmed into the processor(s) 32. Programming and re-programming are accomplished via the Ethernet through the external Ethernet interface 36 only when the device 30 is in a programming mode initiated by the activation of a programming switch 46 during boot-up of the processor(s) 32. In another aspect, programming and reprogramming are accomplished via the internal Ethernet interface 40—also when the device 30 is in a programming mode initiated by the activation of a programming switch 46. In a preferred embodiment, the programming switch 46 is a physical (i.e., hardware) switch that can be actuated manually. For example, the programming switch 46 may comprise a button, lever, plunger, blade, or the like that can be accessed by a tool (not shown) inserted through an aperture in the housing (not shown) containing the electronic components. In other aspects, the programming switch may include a fingerprint scanner or other biometric security device. Thus, any alteration, whether benign or malicious, of the operational software of the device 30 preferably requires physical access to the device 30.

Initiation of the programming mode allows the processor(s) 32 to upload a digitally-authenticated rule-set file received in an encrypted programming signal. In an aspect, digital authentication may occur through the use of public and private keys. For example, when a data guard device is built or set up initially, the process may include burning in a public key. Preferably this key is located in ROM or other memory that cannot be overwritten. In an aspect, updating a rule-set then may require both knowledge of an associated private key to complement the public key and physical access to the data guard 30 and its programming switch 46. If a rule-set is uploaded without the correct private key signature, the device 30 may generate an error, abort the upload process, delete the attempted rule-set upload, and/or the like.

After uploading the rule-set file, in an aspect, the device 30 is allowed to go through a complete power cycle to enter its operational mode as programmed with the new rule-set. A status indicator 48 (preferably a visual indicator such as an LED) may optionally be employed to indicate whether the device 30 is in the programming mode or the operational mode.

As can be seen from FIG. 5, preferably the external Ethernet interface 36 and the internal Ethernet interface 40 are physically and electrically isolated from each other, and can communicate with each other only through the processor(s) 32. This assures that data cannot pass to or from the SCADA devices 22 on the internal network 38 without being validated by the rule-set(s) programmed into the processor(s) 32, thereby providing data security that encompasses all seven OSI model layers (physical, data link, network, transport, session, presentation, and application).

The functional components of the data guard device 30, as described above, are housed in an enclosure (not shown) that is advantageously made of a suitable metal alloy, such as, for example, aircraft grade 6061-T6 aluminum alloy. The above-described electronic components can be advantageously potted or otherwise protected to provide a certain level of tamper protection.

Figure 6:
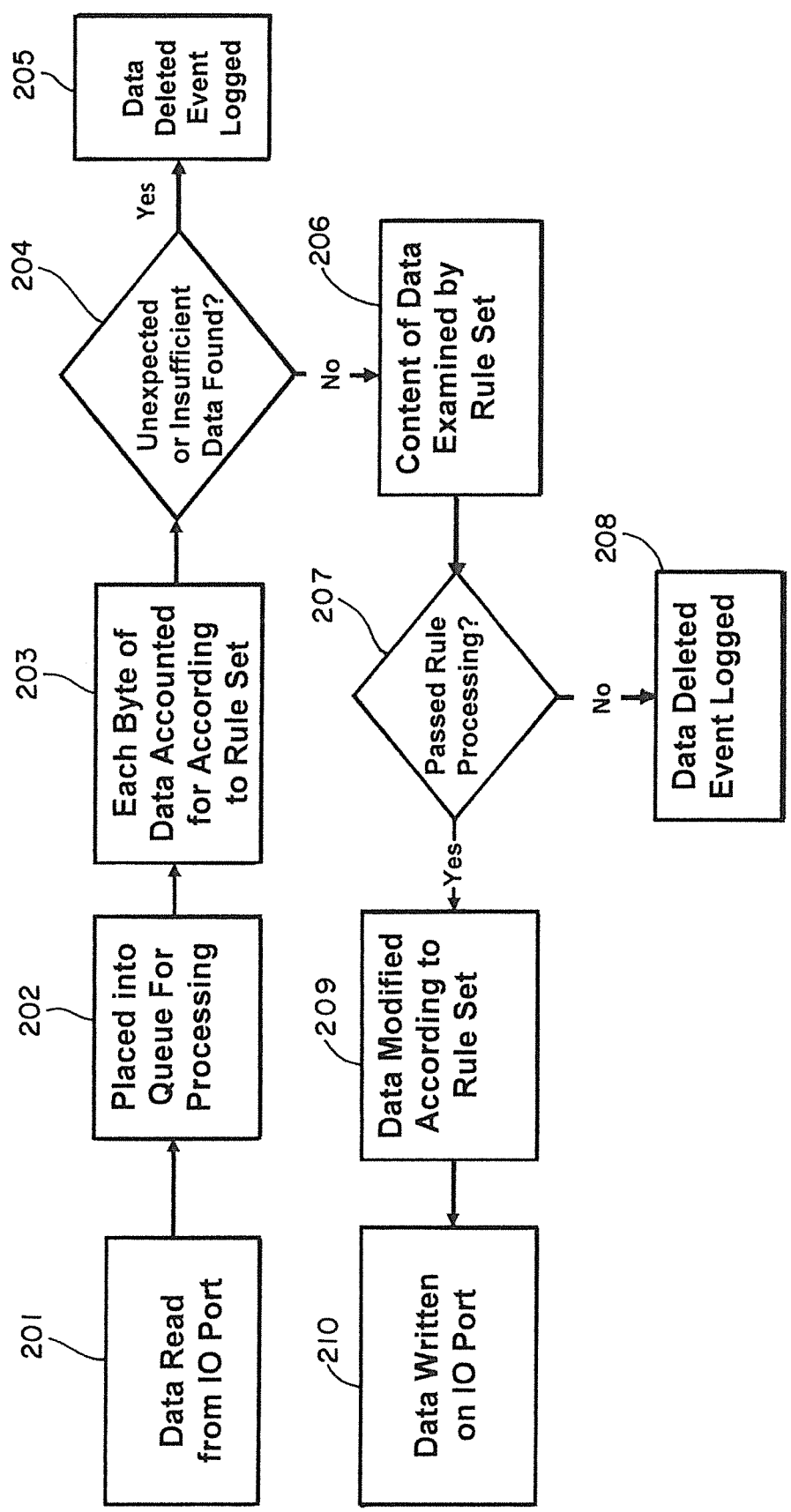
FIG. 6 is a flow chart representing the steps of validating data in accordance with one embodiment of the present disclosure.

FIG. 6 is a data flow diagram for the data validation software used in the cyber-security device 30. Data are read (step 201) from a first input/output (I/O) port operationally associated with either the external Ethernet interface 36 or the internal Ethernet interface 40, depending on whether the data are inbound or outbound. After the data inputted to the I/O port are read, the data are queued for processing (step 202), and then qualified (step 203) (preferably byte-by-byte) by a rule-set, as described above, to determine the presence of malformed or unexpected data ("unqualified" data). If any unqualified data are found ("YES" in decision step 204), such data are deleted, and a log entry is created (step 205). If no such unqualified data are found ("NO" in decision step 204), or if the unqualified data have been deleted in step 205, the content of the qualified data is examined in accordance with the rule-set (step 206) to determine compliance with the validation criteria. If non-compliance is determined ("NO" in decision step 207), the data are deleted, and a log entry is created (step 208). If the data are found to be compliant with the validation criteria, i.e., the data are determined to be valid ("YES" in decision step 207), the data may optionally be modified (as needed) in accordance with any further criteria that may be established by the rule set (step 209), then written (step 210) on a second I/O port operationally associated with whichever of the Ethernet interfaces 36, 40 was not used in the reading step (step 201), and finally outputted from the I/O port to the appropriate Ethernet interface.

An exemplary rule-set that may be used in some embodiments of this disclosure may be generically described as including the following logical processes operating on message data read from an I/O port:

In the first process, the message header is read to determine and verify the message type and the expected message header length and version to validate integrity of the message. This process includes (a) reading the Start of Message byte sequence where applicable; (b) reading N bytes (where N is the number of bytes defined in the rule-set for that message format), indicating the start of the message that comprises the header; and (c) verifying that the header is valid, that there are no illegal values or extra characters in the message, and that all required fields are present and match requirements defined in the rule-set. In another aspect, ASCII messages such as XML may be processed—in a first process—by verifying delimiters or custom delimiters or message criteria to determine message validity as described above.

In an aspect, the first process also advantageously includes comparing the total size of the data read to the message packet size specified in the header to assure that no extra data have been inserted and that no potential data overflows are possible.

In the second process, the contents of the message payload data are looped through to assure that only allowed fields are present in the message and that they conform to limits defined in the rule-set. This process includes repeating a sequence of sub-steps through the entire contents of the message data payload or until an invalid message is detected, or the total amount of data read matches or exceeds the expected message packet size. The sequence of sub-steps comprises: (1) reading M binary bytes that comprise a data field identifier; (2) reading the value and contents of the data field; (3) assuring that the data field is allowed by rule-set; and (4) if allowed, assure that the values of that data are within limits and ranges defined in the rule-set.

In the second process, for example, the message data may be processed to determine if the type of message is allowed and whether or not variables within the message are allowed for that message.

For example, in a particular application, a SCADA device may control water pressure through a given pipe. In an aspect, the SCADA device may allow various commands such as "increase pressure," "decrease pressure," "report pressure," and "emergency stop." In such an application, a data guard device 30 may be programmed to review incoming messages and determine that they are properly formed, are of the right size, and the like. Furthermore, the actual contents of the messages may also be analyzed for compliance with a rule-set. For example, if an "increase pressure" message comes in, the data guard device 30 may ensure that no extra data are tacked onto the message that could be interpreted improperly by the SCADA device according to a first process. According to a second process, the data guard device 30 may also determine if variables, such as function parameters, are within operating limits according to the rule-set. For example, in one rule-set, changes in pressure must occur in increments less than 5 PSI. In such a case, if a "decrease pressure" message is processed with a parameter indicating lowering the pressure by 3 PSI, it is allowed as within the rule-set. On the other hand, if the "decrease pressure" message included a parameter of 35, it may be dropped as seeking a change that is too great for the system's rule-set.

The above-described generic rule-set—and the specific example—are exemplary only and are not limiting. Variations and modifications of a rule-set will readily suggest themselves for particular applications. Rule-sets may be based on any of a variety of message processing rules, including message type, message size, message contents, message source, message destination, message protocol, data rate, system state, the data type and values of message contents, and the like. Moreover, rule-sets may allow for variance based on outside input apart from the message contents itself.

In an aspect, for example, the rule-set can further be programmed to take device state into account when processing messages. While this will often come from the state reported by the SCADA device 22, it can also take into account the states of multiple SCADA devices 22, a SCADA device state, external network device states, internal network device states, combinations or the same, and the like. FIG. 7 illustrates a sample data flow process that includes analyzing messages in light of device states.

As illustrated, in an aspect, a data message is read from an I/O port (step 301). This may comprise a message from an I/O port operationally associated with either an external Ethernet interface 36 or an internal Ethernet interface 40, depending on whether the data message is inbound or outbound. After the data message input to the I/O port is read, the data message is analyzed in a first process (step 302) (preferably byte-by-byte) by a rule-set, as described above, to determine the presence of malformed or unexpected data ("unqualified" data). If any malformed or unqualified data are found ("NO" in decision step 303), the message is deleted, and a log entry may be created (step 309). If the data are well-formed ("YES" in decision step 303), the process continues to step 304 and step 305. In step 304, system state data are read from memory 33 or storage 35 as needed. As described above, in an aspect, the state data are gleaned from previous messages that are processed through the data guard device 30. In another aspect, the data guard device 30 may further be able to poll connected devices for state information, but this additional network traffic may be less desirable or unnecessary.

The message or command type of the qualified data are then examined in accordance with the rule-set and in light of the system state data read from memory (step 305) to determine whether the message/command type is allowed at that time. If the message is not allowed at that time ("NO" in decision step 305), the message and data are deleted, and a log entry is created (step 309). If the message is allowed, ("YES" in decision step 305), the content of the allowed message is examined in accordance with the rule-set and the current system state data (step 306) to determine compliance with the validation criteria. If non-compliance is determined ("NO" in decision step 306), the message and data are deleted, and a log entry is created (step 309). If the data are found to be compliant with the validation criteria in light of the system state data, i.e., the message data are determined to be valid ("YES" in decision step 306), the message data may optionally be used to update the system state data stored in the data guard device 30 (step 307). Then the message is written (step 308) to a second I/O port operationally associated with whichever of the Ethernet interfaces 36, 40 was not used in the reading step (step 301), and finally outputted from the I/O port to the appropriate Ethernet interface.

To return to the example set forth above, a SCADA device controlling water pressure in a pipe has, as a state, the current water pressure. In normal operation, for example, an external control terminal 24 may poll the SCADA device 22 for the water pressure at periodic intervals. This will cause a message to be returned from the SCADA device 22 that includes the current water pressure reading. As the data guard device 30 processes this return message, it may make a copy of the current pressure reading as a part of the current system state. The rule-set may then be set up to allow or deny messages based on the water pressure state variable. For example, a rule-set may include a rule that indicates "increase pressure" or "decrease pressure" messages are only acceptable when the current pressure is outside of a normal pressure range, such as between 70 and 120 PSI. When a proper "report pressure" message is sent through the data guard device 30 to the SCADA device 22, the data guard device 30 passes along the request and receives the response message from the SCADA device 22. In an aspect, the data guard device 30 may process the response message and save the current reading for PSI that is being reported—for example, 75 PSI. If the data guard device 30 then receives an "increase pressure" message, it can review the current pressure state reading and deny the message.

Any of a large number of systems, states, and rule-sets are contemplated herein, and the water pressure example is simply one such possible application. One will understand from the disclosure herein that the data guard systems and methods may be implemented in a variety of applications and situations, such as, for example, industrial control systems, energy management and distribution systems, remote monitoring systems, and the like. Other concrete examples include power stations, oil pipelines, and building HVAC, alarm, fire and other safety systems.

From the foregoing description, it will be appreciated that data guard device 30 cannot be configured or otherwise modified by users over an internal or external network without physical access to the device (due to needing access to the programming switch 46). Therefore, the security provided by the data guard device 30 cannot be overridden or by-passed, even if other protections, such as a firewall or IDS, are compromised.

Significantly, the data guard device 30 provides bi-directional protection across all seven OSI model layers in an aspect. This is achieved through the use of two segregated network interfaces providing physical and data-link layer protection between each SCADA device 22 and the control network. Furthermore, the data guard device 30 protects the network and transport OSI model layers by limiting network data traffic to only the configured IP addresses and ports to and from each individual SCADA device. In addition, the data guard device 30 protects the session, presentation, and application OSI model layers through data validation and rule-sets that define what data can be sent to and from each SCADA device 22 based at least in part on the data content of network traffic. Additionally, these layers can also be protected through encryption, which is supported in at least some aspects. Moreover, the data guard device 30 does not modify the message protocol, utilize a proxy, or require any modification to existing software or hardware on the SCADA network. Finally, the re-programmable feature described above allows the data guard device 30 to support custom rule-sets and configurations to tailor it to any SCADA device and network.

Although the present disclosure has been described with reference to specific aspects, these aspects are illustrative only and not limiting. For example, although the description above has been described with respect to a data guard device, any other device may be configured to perform the foregoing function. In an aspect, for example, data guard functionality may be built into a SCADA device. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art

What is claimed is:

1. A cyber-security device for providing secure communication of automation and control data between a first network and a second network in a system operable in one or more system states, the cyber-security device comprising:
   a first network interface configured to accept messages destined for a supervisor control and data acquisition (SCADA) device or an automation and control device in the second network and transmitting qualified and validated messages to the first network;
   a second network interface configured to accept messages destined for the first network and transmitting qualified and validated messages to the second network;
   a memory configured to store current system state information and a programmable rule-set comprising rules for qualifying and validating messages on a byte-by-byte basis, wherein at least one of the rules is a system state-dependent rule;
   a processor operatively coupled to the memory and to the first network interface and the second network interface, and configured to qualify and validate messages from the first network interface and the second network interface on a byte-by-byte basis; and
   a physical switch operable to initiate a programming mode of the processor, wherein the processor is operable to replace the programmable rule-set with a new rule-set from the memory only when in the programming mode, and to cycle back to an operational mode after the new rule-set is loaded from the memory;
   wherein the processor is operable in the operational mode to:
     accept messages received from one of the first network interface and the second network interface, wherein at least some of the received messages contain received system state information;
     retrieve the programmable rule-set and the current system state information from the memory;
     qualify the received messages, on a byte-by-byte basis, based on compliance with the programmable rule-set;
     for any received message that has been qualified, validate the qualified received message, on a byte-by-byte basis, in accordance with the programmable rule-set and based on the current system state information from the memory;
     transmit each of the received messages to the other of the first network interface and the second network interface only when the received message is validated and in compliance with the programmable rule-set; and update the current system state information based on the contents of the qualified and validated received messages that include the received system state information.

2. The cyber-security device of claim 1, wherein the processor is further operable to drop the received message when the received message cannot be validated and to create an error log entry based on the dropped message.

3. The cyber-security device of claim 1 wherein the processor is further operable to update the current system state information when at least one of the received messages includes system state information that the processor can validate based on the programmable rule-set.

4. The cyber-security device of claim 3, wherein the received message that includes system state information is accepted at the second network interface and comes from the SCADA device or the automation and control device in the second network.

5. The cyber-security device of claim 1, wherein the physical switch is selected from the group consisting of at least one of a button, a switch, a pin, a lever, a plunger, a blade, and a fingerprint scanner.

6. A method of providing secure communication of automation and control data between a network and a supervisor control and data acquisition (SCADA) device or an automation and control device in a system operable in any of several system states, wherein a current system state of the system is indicated by a current system state indication, the method comprising:

accepting incoming messages, at least some of which contain system state information, from the network and bound for the SCADA device or the automation and control device at a first network interface that is in data communication with a processor programmed with a programmable rule-set that includes rules for qualifying the accepted incoming messages for message size and message type, and for validating message contents in the accepted incoming messages, the programmable rule-set including a system state-dependent rule;

processing each accepted incoming message bound for the SCADA device or the automation and control device by operating the processor to implement the programmable rule-set so as to qualify and validate, on a byte-by-byte basis, each accepted incoming message bound for the SCADA device or the automation and control device in accordance with the programmable rule-set for message type, message size, message contents, and compliance with the system state-dependent rule based on the current system state indication;

sending only the incoming messages that are qualified and validated based on the programmable rule-set to a second network interface that is in data communication with the processor for transmission to the SCADA device or the automation and control device;

accepting outgoing messages, at least some of which contain system state information, from the SCADA device or the automation and control device at the second network interface;

processing each accepted outgoing message from the SCADA device or the automation and control device by operating the processor to implement the programmable rule-set so as to qualify and validate, on a byte-by-byte basis, each accepted outgoing message from the SCADA device or the automation and control device in accordance with the programmable rule-set for message type, message size, message contents, and compliance with the system state-dependent rule based on the current system state indication;

sending only the outgoing messages that are qualified and validated based on the programmable rule-set to the first network interface for transmission to the network;

updating the current system state indication based on the system state information contained in the qualified and validated incoming messages and/or the qualified and validated outgoing messages; and dropping incoming messages and outgoing messages that cannot be qualified and validated in accordance with the programmable rule-set.

7. The method of claim 6, wherein the programmable rule-set is a first rule-set, the method further comprising:

accepting an input from a physical switch to put the processor into a programming mode;

accepting a second programmable rule-set including a system state-dependent rule from the network only while the processor is in the programming mode;

replacing the first rule-set with the second programmable rule-set;

exiting the programming mode; and processing future incoming messages and outgoing messages between the SCADA device or the automation and control device based on the second rule-set by operating the processor to implement the second rule-set so as to qualify and validate, on a byte-by-byte basis, each accepted incoming message and accepted outgoing message between the network and the SCADA device or the automation and control device in accordance with the second programmable rule-set.

8. The method of claim 7, wherein the validation provided by the programmable rule-set is dependent on the current system state indication.

9. A non-transitory computer-readable medium for use in a system operable in any of several system states, each of which is indicated by a current system state indication, the non-transitory computer-readable medium including instructions that, when executed by a processor in the system, cause the processor to:

accept incoming messages, at least some of which contain system state information, from a network and bound for a supervisor control and data acquisition (SCADA) device or an automation and control device at a first network interface that is in data communication with the processor, wherein the processor has been programmed with a programmable rule-set that includes rules for qualifying and validating the accepted incoming messages for message size and message type, and for validating message contents in the accepted incoming messages, wherein the programmable rule-set also includes a system state-dependent rule;

process each accepted incoming message bound for the SCADA device or the automation and control device by operating the processor to implement the programmable rule-set so as to qualify and validate, on a byte-by-byte basis, each accepted incoming message bound for the SCADA device or the automation and control device in accordance with the programmable rule-set based on the current system state indication;

send only the accepted incoming messages that are qualified and validated based on the programmable rule-set to a second network interface that is in data communication with the processor for transmission to the SCADA device or the automation and control device;

accept outgoing messages, at least some of which contain second system state information, from the SCADA device or the automation and control device at the second network interface;

process each accepted outgoing message from the SCADA device or the automation and control device by operating the processor to implement the programmable rule-set so as to qualify and validate, on a byte-by-byte basis, each accepted outgoing message from the SCADA device or the automation and control device in accordance with the programmable rule-set based on the current system state indication;

send only the accepted outgoing messages that are qualified and validated based on the programmable rule-set to the first network interface for transmission to the network;

update the current system state indication based on the contents of the qualified and validated incoming messages and/or the qualified and validated outgoing messages; and drop incoming messages and outgoing messages that cannot be qualified and validated in accordance with the programmable rule-set.

10. The non-transitory computer-readable medium of claim 9, wherein the programmable rule-set is a first rule-set, the non-transitory computer-readable medium further comprising instructions to:

accept an input from a physical switch to put the processor into a programming mode;

accept a second programmable rule-set including a system-state-dependent rule at the first network interface only while the processor is in the programming mode;

replace the first rule-set with the second programmable rule-set;

exit the programming mode; and process future messages between the network and the SCADA device or the automation and control device based on the second rule-set by operating the processor to implement the second rule-set so as to qualify and validate, on a byte-by-byte basis, each accepted incoming message and accepted outgoing message between the network and the SCADA device or the automation and control device in accordance with the second programmable rule-set.

11. The non-transitory computer-readable medium of claim 9, wherein the validation of the accepted incoming messages and the accepted outgoing messages by the programmable rule-set is dependent on the current system state indication.

12. A cyber-security device for providing secure data communication of supervisor control and data acquisition (SCADA) or automation protocol data messages between an external network and an internal network of an automation and control system, at least one of the internal network and the external network including at least one of a SCADA device and an automation and control device, the cyber-security device comprising:

an external communication interface configured to send data messages to, and receive data messages from, the external network;

an internal communication interface configured to send data messages to, and receive data messages from, the internal network;

a memory configured to store the current system state and a processor-implementable rule-set defining qualification criteria and validation criteria for data contents of incoming data messages received from the external network and data contents of outgoing data messages received from the internal network, wherein the processor-implementable rule-set includes a system state-dependent rule that is based on the current system state;

a processor in communication with the external communication interface, the internal communication interface, and the memory;

wherein the processor is operable in an operational mode to:

accept incoming data messages from the external network into the processor, wherein at least some of the incoming data messages have content including system state information;

determine the indication of the current system state of the system from the memory;

qualify, on a byte-by-byte basis, the content of each incoming data message received from the external network by compliance with the data qualification criteria defined by processor-implementable the rule-set;

validate, on a byte-by-byte basis, the content of each qualified incoming data message by compliance with the data validation criteria defined by the processor-implementable rule-set, including compliance with the system state-dependent rule based on the current system state;

output from the processor to the internal network only those incoming data messages the content of which has been qualified and validated;

accept outgoing data messages from the internal network into the processor, wherein at least some of the outgoing data messages have content including system state information;

qualify, on a byte-by-byte basis, the content of each outgoing data message received from the internal network by compliance with the data qualification criteria defined by the processor-implementable rule-set;

validate, on a byte-by-byte basis, the content of each qualified outgoing data message by compliance with the data validation criteria defined by the processor-implementable rule-set, including compliance with the system state-dependent rule based on the current system state;

output from the processor to the external network only those outgoing data messages the content of which has been qualified and validated; and update the current system state based on at least some of the qualified and validated content of one or more of the incoming data messages or the outgoing data messages; and a physical switch operable to initiate a programming mode of the processor by switching from the operational mode to the programming mode;

wherein, in the programming mode, the processor is operable to load a new rule set and to cycle back to the operational mode after the new rule set is loaded.

13. The cyber security device of claim 12, wherein the processor-implementable rule-set includes a first rule set configured to process the data messages received from the external network, and a second rule set configured to process the data messages received from the internal network.

14. The cyber-security device of claim 12, wherein the memory is configured for storing the system state information derived from the qualified and validated incoming data messages and/or the qualified and validated outgoing data messages received from one or both of the external network and the internal network.

15. The cyber-security device of claim 12, further comprising a status indicator configured to provide an indication of whether the processor is in the operational mode or in the programming mode.

16. The cyber-security device of claim 12, wherein at least one of the external communication interface and the internal communication interface is an Ethernet interface.

17. The cyber-security device of claim 12, wherein the processor is configured to store in the memory the updated current system state based on the system state information received from one of the internal network and the external network.

18. A method for providing secure communication of data messages between an internal network and an external network, at least one of the internal network and the external network including at least one of a supervisor control and data acquisition (SCADA) device and an automation and control device, the method comprising:
   determining a current system state of the system;
   providing a processor programmed with a processor-implementable rule-set configured for qualification and validation of the content of the data messages, the rule-set defining data qualification criteria and validation criteria, the processor-implementable rule-set including a system state-dependent rule;
   accepting incoming data messages from the external network into the processor, wherein at least some of the incoming data messages have content including system state information;
   qualifying, on a byte-by-byte basis, the content of each incoming data message received from the external network by compliance with the data qualification criteria defined by the processor-implementable rule-set;
   validating, on a byte-by-byte basis, the content of each qualified incoming data message by compliance with the data validation criteria defined by the processor-implementable rule-set and by compliance with the system state-dependent rule based on the current system state;
   outputting from the processor to the internal network only those incoming data messages the content of which has been qualified and validated;
   accepting outgoing data messages from the internal network into the processor, wherein at least some of the outgoing data messages have content including second system state information;
   qualifying, on a byte-by-byte basis, the content of each outgoing data message received from the internal network by compliance with the data qualification criteria defined by the processor-implementable rule-set;
   validating, on a byte-by-byte basis, the content of each qualified outgoing data message by compliance with the data validation criteria defined by the processor-implementable rule-set and by compliance with the system state-dependent rule based on the current system state;
   outputting from the processor to the external network only those outgoing data messages the content of which has been qualified and validated; and
   updating the current system state of the system based on at least some of the qualified and validated content of one or more of the incoming data messages or outgoing data messages.

19. The method of claim 18, wherein the processor-implementable rule-set includes a first rule-set configured to process the incoming data messages received from the external network, and a second rule-set configured to process the outgoing data messages received from the internal network.

20. The method of claim 18, wherein the processor has an operational mode and a programming mode, and wherein the processor-implementable rule-set is implemented only when the processor is in the operational mode.

21. The method of claim 20, further comprising re-programming the processor with a new processor-implementable rule-set only when the processor is in the programming mode.

22. The method of claim 21, wherein the re-programming is performed by:
   initiating the programming mode of the processor by switching from the operational mode to the programming mode;
   loading the new processor-implementable rule-set into the processor; and
   cycling the processor back to the operational mode.

23. The method of claim 22, wherein the loading of the new processor-implementable rule-set is performed via an Ethernet interface.

24. The method of claim 22, wherein the initiating of the programming mode is performed manually with a physical switch operably associated with the processor.

25. The method of claim 18, wherein the qualification of the content of the incoming data messages and the outgoing data messages comprises:
   determining the presence, in each data message, of unqualified content that is not in compliance with the data qualification criteria defined by the processor-implementable rule-set; and
   deleting any unqualified content determined to be present.

26. The method of claim 25, wherein the validation of the content of the incoming data messages and the outgoing data messages comprises:
   examining, in accordance with the data validation criteria defined by the processor-implementable rule-set, the qualified content of the incoming data messages and the outgoing data messages that have not been deleted, to determine compliance of the qualified content of the incoming data messages and the qualified content of the outgoing data messages with the data validation criteria defined by the processor-implementable rule-set; and
   deleting any content determined to be non-compliant with the data validation criteria defined by the processor-implementable rule-set.

27. The method of claim 26, wherein the validation further comprises, after examining the qualified content of the incoming data messages and the qualified content of the outgoing data messages, modifying at least some of the qualified content of the incoming data messages and the qualified content of the outgoing data messages that has not been deleted so as to be compliant with further data validation criteria defined by the processor-implementable rule-set.

28. The method of claim 26, further comprising creating a log entry in response to the deletion of unqualified content and/or non-compliant content.

29. An automation and control system that is operable in one or more system states and that includes a cyber-security functionality, the automation and control system comprising:

an external network including an external control terminal;

an internal network including at least one of a supervisor control and data acquisition (SCADA) device and an automation and control device;

a processor in data communication with the external network and the internal network;

a memory operatively associated with the processor and configured to store an indication of a current system state and a rule-set defining qualification and validation criteria for data contents of incoming data messages received from the external network and data contents of outgoing data messages received from the internal network, wherein the rule-set includes a system state-dependent rule;

wherein the processor is operable in an operational mode to process the incoming data messages and the outgoing data messages in accordance with the rule-set so as to (a) qualify, byte-by-byte, (i) the content of each of the incoming data messages received from the external network via the external communication interface as conforming to qualification criteria defined by the rule-set for external-to-internal communications, and (ii) the content of each of the outgoing data messages received from the internal network via the internal communication interface as conforming to qualification criteria defined by the rule-set for internal-to-external communications; (b) validate, byte-by-byte, the content of each qualified data message in accordance with validation criteria defined by the rule-set; (c) pass between the internal network and the external network only data content that has been qualified and validated and that is deemed proper based on the indication of the current system state and compliance of any system state information contained in the incoming data messages and/or the outgoing data messages with the system state-dependent rule, and (d) update the indication of current system state based on the content of each of the qualified and validated data messages, and wherein the processor is re-programmable with a new rule-set only in a programming mode; and a physical switch operable to initiate the programming mode of the processor by switching from the operational mode to the programming mode.

30. The system of claim 29, wherein the processor is in data communication with the external network via an external Ethernet interface, and wherein the processor is in data communication with the internal network via an internal Ethernet interface.

31. The system of claim 30, wherein the processor is re-programmable via the external Ethernet interface.

32. The system of claim 29, wherein the processor is configured to cycle back to the operational mode after the processor is re-programmed with the new rule-set.

33. The system of claim 29, further comprising a power supply operatively associated with the processor and configured for connection to an external power source providing a DC voltage within a predetermined voltage range, and for supplying the processor with a fixed operational DC voltage converted from the voltage provided by the external power source.

34. The system of claim 33, wherein the predetermined voltage range is between 5 and 32 volts.

35. The system of claim 29, further comprising a status indicator configured to provide an indication of whether the processor is in the operational mode or in the programming mode.

36. The system of claim 29, wherein the rule-set includes a first rule-set configured to process the incoming data messages received from the external network, and a second rule-set configured to process the outgoing data messages received from the internal network.

\* \* \* \* \*

UNITED STATES PATENT AND TRADEMARK OFFICE
CERTIFICATE OF CORRECTION

| | |
|---|---|
| PATENT NO. | : 9,729,507 B2 |
| APPLICATION NO. | : 14/668602 |
| DATED | : August 8, 2017 |
| INVENTOR(S) | : Peter Fischer et al. |

Page 1 of 1

It is certified that error appears in the above-identified patent and that said Letters Patent is hereby corrected as shown below:

In the Drawings

On sheet 5 of 7, in Figure 5, reference numeral 46, Line 1, delete "Programing" and insert -- Programming --, therefor.

In the Specification

In Column 6, Line 14, after "designated" delete ".".

In Column 8, Line 44, delete "the" and insert -- exemplary --, therefor.

In Column 8, Line 45, delete "in the" and insert -- in an embodiment of the --, therefor.

In Column 8, Line 45, delete "Data are" and insert -- A data message is --, therefor.

In Column 8, Line 49, delete "are" and insert -- message is --, therefor.

In Column 9, Line 3, delete "outputted" and insert -- output --, therefor.

In Column 12, Line 19, after "art" insert -- . --.

Signed and Sealed this
Seventeenth Day of July, 2018

Andrei Iancu
*Director of the United States Patent and Trademark Office*